United States Patent Office 3,647,803
Patented Mar. 7, 1972

---

3,647,803
METHOD FOR HYDROCARBON SOLUBLE ORGANO SODIUM COMPOUNDS
Richard J. Schlott, Arlington Heights, Donald F. Hoeg, Mount Prospect, and John F. Pendleton, Barrington, Ill., assignors to Borg-Warner Corporation, Chicago, Ill.
No Drawing. Continuation-in-part of application Ser. No. 626,979, Mar. 30, 1967. This application Mar. 24, 1970, Ser. No. 22,394
Int. Cl. C07d 51/70
U.S. Cl. 260—268 T                          6 Claims

ABSTRACT OF THE DISCLOSURE

A method of providing active hydrocarbon soluble organosodium reagents by reacting organosodium compounds with aliphatic tertiary diamines and separating the homogeneous active hydrocarbon soluble organosodium products from the insoluble organosodium preparation by-products.

---

This application is a continuation-in-part of Ser. No. 626,979, filed Mar. 30, 1967, now abandoned.

BACKGROUND

Prior to this invention, organosodium compounds containing carbon-sodium chemical bonds were known and were considered useful in numerous chemical reactions such as metalation and vinyl monomer anionic polymerization initiation. The majority of the organosodium compounds, however, were insoluble in aliphatic, cycloaliphatic and aromatic hydrocarbons and the reactions using these compounds were normally carried out as slurries and suspensions. It was well-known that handling of these slurries and suspensions was often extremely difficult due to stratification and lack of homogeneity of the slurry. Their easy thermal decomposition, lack of volatility, their reactivity to ethers and olefins and insolubility in hydrocarbon solvents is consistent with their salt-like character and adds to the difficulty of manipulation. Generally, the insoblubility of the organosodium compounds precluded their practical separation from the hydrocarbon insoluble sodium salts that were formed as by-products of the commercial synthesis of the organosodium compounds. The commercial synthesis of organosodium compounds was normally accomplished by the reaction of an organic halide and sodium metal according to the following equation:

$$R\text{—}X + 2Na \rightarrow R\text{—}Na + NaX$$

wherein R was an alkyl or aromatic radical and X was halogen. The most economical synthesis generally utilized organic chlorides in the reaction. The inseparable solid product mixture frequently consisted not only of the organosodium compound and the insoluble sodium chloride, but of reaction by-products and unreacted sodium metal as well.

SUMMARY OF THE INVENTION

Briefly described, the present invention is directed to a method of obtaining saturated hydrocarbon solutions of homogeneous hydrocarbon soluble, chemically active alkyl and simple aryl sodium reagents by contacting the hydrocarbon-insoluble organosodium compound with a saturated aliphatic tertiary diamine and separating the active organosodium products from any insoluble products remaining at the end of the reaction. A number of physical methods may be employed in effecting separation of the hydrocarbon soluble organosodium reagent from insoluble products, such as filtration, settling out followed by decantation, centrifugation and the like. Filtration is often preferred because the hydrocarbon solutions of the soluble organosodium reagents are normally of low viscosities and are therefore very fluid.

The saturated aliphatic tertiary diamines useful in this invention are regarded in the art as complexing diamines and include bifunctional tertiary diamines such as (1) tetraalkylalkylene diamines represented by the formula:

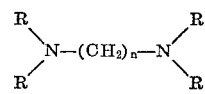

wherein $n$ is an integer from about 1 to 5 and R is an alkyl group containing from 1 to about 3 carbon atoms, and (2) alkylene tertiary diamines such as triethylene diamine (DABCO) and sparteine, and (3) N,N'-dialkyl-dialkylene-tertiary-diamines such as N,N'-dimethylpiperazine, and (4) compounds of the formula

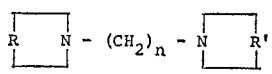

in which $n$ is an integer from 1 to 5 and R and R' are the same or different hydrocarbon diradicals and (5) di-(di-alkylamino)-cyclohexanes.

The hydrocarbon insoluble organosodium compounds which are reacted with the saturated aliphatic tertiary diamines by the process of this invention may be represented by the formula R—Na wherein R is a lower alkyl, arylalkyl or aromatic group.

Organosodium compounds which may be suitable for the practice of this invention include those where R is a lower (1–8 carbon atoms) primary alkyl group, such as methyl, ethyl, propyl, butyl, isobutyl, amyl, neoamyl, and the like, and where R is an aralkyl group such as benzyl, β-phenylethyl and the like, and where R is an aromatic group such as phenyl, biphenyl, naphthyl and the like.

The saturated aliphatic tertiary diamine is generally used in equimolar concentrations up to about 2:1 molar ratios of diamine to insoluble organosodium compound with good results. Although larger quantities of diamine may be employed, they are generally unnecessary.

The soluble organosodium complexes produced in accordance with this invention undergo the same type of reactions as the heterogeneous hydrocarbon insoluble organosodium compounds, however, the soluble products of this invention react much more rapidly in many cases, as for example, in the initiation of vinyl monomer anionic addition polymerizations. It is apparent that the soluble organosodium reagents prepared by this invention are generally more versatile and useful than the previously known heterogeneous organosodium compounds by virtue of their homogeneity and physical state, in that the separation, handling and transfer of known specific quantities of reactive organosodium compounds are more readily accomplished.

Also, it should be noted that the soluble organosodium products prepared in accordance with this invention, react much more efficiently in processes such as metalation of polymers than do the heterogeneous organosodium compounds. The extremely rapid and efficient metalation of polymers is described and claimed in our copending application Ser. No. 626,978.

The following examples illustrate the preparation of saturated hydrocarbon soluble organosodium reagents and their separation from insoluble products remaining at the end of the reaction. The examples also set forth certain chemical reactions of the organosodium reagents such as metalation and vinyl monomer anionic polymerization initiation and the reaction of the organosodium reagents with carbon dioxide to illustrate the presence of hydrocarbon soluble organosodium compounds.

EXAMPLE 1

Normal butylsodium was prepared according to the procedure of Lochmann et al. Tetrahedron Letters 2,257 (1966). 25 mmoles of N,N,N',N'-tetramethylethylene diamine (TMEDA) were added to a beige suspension of 15 mmoles n-butylsodium in 100 mls. dry cyclohexane under argon and a homogeneous clear yellow solution formed immediately. The soluble complex formed from the reaction (15 mmoles) was transferred onto crushed Dry Ice and the aqueous base-soluble fraction yielded 0.35 g. of n-pentanoic acid as identified by gas liquid chromatography and infrared absorption in comparison with an authentic sample, thereby demonstrating the presence of the active soluble butylsodium species.

EXAMPLE 2

Five mmoles of the soluble n-butylsodium complex described in Example 1 was added to 50 mls. cyclohexane in a 12 oz. bottle capped with a perforated crown cap and neoprene liner and 5.4 g. of pure dry butadiene-1,3 was added in one portion. The reaction exothermed and thickened immediately as a result of the rapid polymerization to produce polybutadiene.

EXAMPLE 3

Using the procedure described in Example 2, but omitting the TMEDA, 5.4 g. of butadiene-1,3 were added to a suspension of 5 mmoles of n-butylsodium in 50 mls. of cyclohexane. The reaction mixture was stirred continuously. No evidence of reaction was noted until about 15 minutes had elapsed, at which time polymerization was noted.

EXAMPLE 4

The procedure described in Example 3 was followed with the exception that 5 mmoles of triethylamine were added to the suspension of n-butylsodium prior to the addition of butadiene-1,3. The addition of triethylamine did not solubilize the sodium compound and the results after the addition of butadiene-1,3 were the same as noted in Example 3.

EXAMPLE 5

Phenylsodium was prepared in a Schlenk tube by reaction of chlorobenzene with sodium dispersion yielding a suspension of phenylsodium mixed with sodium chloride. The solid product was washed with dry cyclohexane and filtered under an argon atmosphere. 20 mmoles TMEDA in 100 mls. cyclohexane was added to this solid reaction product. A dark suspension resulted which was filtered out of the Schlenk tube into a pop bottle under argon yielding a clear orange solution of the phenylsodium-TMEDA complex. This solution was poured onto crushed Dry Ice and upon acidification of the aqueous base-soluble fraction, 0.9 g. of benzoic acid was obtained as identified by melting point and infrared spectrum, thereby establishing the presence of active soluble phenylsodium species.

EXAMPLE 6

To a suspension of 10 mmoles phenylsodium prepared as in Example 5 (prior to solubilization) in a Schlenk tube were added 10 mmoles of spartein yielding on filtration a dark orange homogeneous solution similar to that obtained in Example 5. 5.4 g. of butadiene-1,3 was added to this soluble phenylsodium complex. Initiation of the polymerization was immediate and exothermic.

EXAMPLE 7

Butadiene-1,3 was added under anhydrous, air-free conditions to a phenylsodium slurry in cyclohexane; and no evidence of polymerization was observed in an hour.

EXAMPLE 8

The procedure in Example 7 was repeated except triethylamine was added in a molar equivalent to the phenylsodium before the addition of the butadiene. No solubilization or color change was observed on the addition of the triethylamine and no evidence of polymerization was observed in an hour.

EXAMPLE 9

Normal amylsodium was prepared according to the procedure of Morten et al. (J. Org. Chem., 20, 428, 1955) by the reaction of n-amylchloride with sodium dispersion. The addition of 3 mmoles TMEDA to 3 mmoles of amylsodium reaction mixture in 100 mls. of cyclohexane yielded an amber-colored solution of the n-amylsodium complex containing suspended sodium chloride as a preparation by-product.

This reaction mixture was filtered yielding a clear homogeneous amber solution of n-amylsodium complex in cyclohexane. The experiment was repeated using 6 mmoles of DABCO in place of the TMEDA and the same results were obtained.

EXAMPLE 10

Polystyrene (2.5 g.) in air-free, dry cyclohexane was added to the two soluble complexes of n-amylsodium prepared in Example 9. A gelled precipitate of metalated polystyrene formed in less than three minutes in each case. The characterization and utility of these metalated structures is described in our copending application Ser. No. 626,978.

EXAMPLE 11

A slurry of n-butylsodium in cyclohexane was prepared and 0.6 mmoles was added to each of three pop bottles having perforated crown caps and neoprene liners. Two bottles contained cyclohexane and one tetrahydrofuran (THF). In each bottle, the slurry remained as a slurry without apparent solubilization. 2 mmoles TMEDA was added to bottle A (cyclohexane) and the mixture became homogeneous. 2 mmoles tetrahydrofuran was added to bottle B (cyclohexane) and the mixture remained apparently unchanged. The mixture in bottle C (THF) remained heterogeneous.

Pure, dry butadiene-1,3 (5.4 g.) was added to each bottle and the results are summarized in the following table:

| | n-BuNa (mmoles) | Solvent | Complexing (agent mmoles) | Butadiene (g.) | Initiation time (min.) | Total time (hr.) | Yield (percent) |
|---|---|---|---|---|---|---|---|
| Bottle: | | | | | | | |
| A | 0.6 | Cyclohexane | TMEDA (2.0) | 5.4 | 1 | 2 | 102 |
| B | 0.6 | ....do.... | THF[1] (2.0) | 5.4 | 10 | 2 | 97.2 |
| C | 0.6 | THF[1] | | 5.4 | ([2]) | 2 | 6.5 |

[1] Pure, dry and air-free.  [2] Not detectable.

The reaction with the soluble organosodium reagent was immediate, while a trace of tetrahydrofuran in B did not substantially decrease the initiation time over the uncomplexed organosodium slurry of Example 3. Both A and B yields were essentially quantitative indicating that the active species is intact throughout the polymerization. The low yield in bottle C indicated that all the organosodium compound was destroyed before the polymerization was at 10% conversion.

EXAMPLE 12

Ethyl sodium was prepared from diethyl mercury by the reaction of an excess of sodium dispersion. To a pentane dispersion of 0.1 m. of the product ethyl sodium at −10° were added 0.01 m. of TMEDA, yielding a yellow solution of the ethyl sodium complex containing suspended sodium metal and sodium amalgam as preparation byproducts. Centrifugation, followed by decantation provided 100 ml. of a clear, homogeneous solution of the ethyl sodium complex in pentane. The cautious addition of this solution to a stirred solution of 0.02 mole of trimethylchlorosilane in 200 ml. of pentane, provided on workup 0.6 g. of ethyl trimethylsilane, identified by boiling point and infrared absorption in comparison with an original sample.

EXAMPLE 13

Benzyl sodium (.05 m.) prepared from benzyl lithium in the same manner as the butyl sodium of Example 1, was suspended in 250 ml. of methylcyclohexane at −20° C., and treated with 0.05 m. of TMEDA. The resulting clear, red solution, obtained on filtration, was transferred on to Dry Ice. The solid obtained an acidification was collected and identified by infrared absorption and melting point as phenyl acetic acid, thus demonstrating the presence of active benzyl sodium in the filtrate.

EXAMPLE 14

To a suspension of 6 mmoles of neopentyl sodium in heptane, prepared from neopentyl bromide and sodium metal, were added 6 mmoles of N,N,N',N'-tetramethyl 1,3-propane diamine (TMPDA). The resulting yellow solution, obtained by filtration, was added to a capped, dry bottle containing 6.0 g. of styrene monomer in 100 ml. of cyclohexane. An immediate exothermic, anionic initiation of styrene polymerization occurred, and the mixture thickened as a result of the formation of polystyrene. After two hours at 50° C., followed by cooling to room temperature, an additional 15 moles of the neopentyl sodium-TMPDA solution were added to the polymer solution. A gelled precipitate of metalated polystyrene formed rapidly.

It will be apparent from the foregoing examples that the method of this invention provides a variety of organosodium compounds in an advantageously useful form. Inasmuch as the soluble products of this invention undergo in general the same metalation, polymer initiation and derivatizing reactions as the heterogeneous analogs, it will be apparent to one skilled in the art to employ these and similar structures in such uses.

In Examples 1, 5 and 13, the reagent was used as a synthetic intermediate in a carboxylation reaction. The reagent was used as an intermediate and silylation reaction in Example 12. The reagent served as a polymerization initiator in Examples 2, 6 and 14. The reagent served as a metalating aid in Examples 10 and 14.

Examples 3, 4, 7, 8 and 11 show that slower initiations occur without the diamine present.

Example 9 shows the preparation of the complex in hydrocarbon solution and illustrates the separation of the insoluble components.

This invention has been described in connection with certain specific embodiments that illustrate the preparation and use of hydrocarbon soluble organosodium reagents, however, it should be understood that this is by way of illustration and not limitation. Those skilled in the art will recognize that hydrocarbon soluble organosodium reagents other than those specifically set forth may be prepared in accordance with this invention. The scope of the invention is defined solely by the appended claims which should be construed as broadly as is consistent with the prior art.

What is claimed is:

1. A method of preparing a homogeneous solution of a chemically active sodium reagent selected from the group consisting of alkyl, arylalkyl and aromatic sodium reagents which comprises reacting in a dry, inert atmosphere and in the presence of a saturated aliphatic hydrocarbon, an organosodium compound selected from the group consisting of lower (1–8 carbon atoms) primary alkylsodiums, phenyl (lower) alkyl and mono and bicyclic aryl sodiums, with a saturated tertiary diamine selected from the group consisting of N,N,N',N'-tetra 1 to 3 carbon alkyl diamino alkanes, diazabicyclo octane and sparteine, and separating the insoluble material remaining at the end of the reaction from the solution of the reaction product.

2. The method of claim 1 wherein the organosodium compound is a primary alkylsodium.

3. The method of claim 1 wherein the organosodium compound is phenylsodium.

4. The method of claim 1 wherein the aliphatic tertiary diamine is N,N,N',N'-tetramethylethylene diamine.

5. The method of claim 1 wherein the aliphatic tertiary diamine is triethylene diamine.

6. The method of claim 1 wherein the aliphatic tertiary diamine is sparteine.

References Cited

UNITED STATES PATENTS

| | | | |
|---|---|---|---|
| 2,750,417 | 6/1956 | Closson | 260—288 R |
| 2,799,705 | 7/1957 | De Pree | 260—288 R |
| 3,206,519 | 9/1965 | Eberhardt | 260—268 T |
| 3,321,479 | 5/1967 | Eberhardt et al. | 260—268 T |
| 3,492,369 | 1/1970 | Naylor | 260—879 |
| 3,499,036 | 3/1970 | Vandenberg | 260—583 P |

DONALD G. DAUS, Primary Examiner

U.S. Cl. X.R.

260—93.5 S, 94.6, 268 R, 293 A, 563 C, 583 P, 668 R, 676 R